(12) United States Patent
Colignon

(10) Patent No.: US 7,493,755 B2
(45) Date of Patent: Feb. 24, 2009

(54) SYSTEM FOR ASSISTING THE REGENERATION OF DEPOLLUTION MEANS FOR A MOTOR VEHICLE ENGINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 11/571,261

(22) PCT Filed: Jun. 22, 2005

(86) PCT No.: PCT/FR2005/050478

§ 371 (c)(1),
(2), (4) Date: Dec. 22, 2006

(87) PCT Pub. No.: WO2006/005876

PCT Pub. Date: Jan. 19, 2006

(65) Prior Publication Data

US 2007/0261389 A1    Nov. 15, 2007

(30) Foreign Application Priority Data

Jun. 23, 2004    (FR) .................................... 04 06866

(51) Int. Cl.
*F01N 3/00*    (2006.01)
(52) U.S. Cl. .............................. 60/295; 60/274; 60/297; 60/301; 60/311
(58) Field of Classification Search .................. 60/274, 60/286, 295, 297, 301, 311, 280
See application file for complete search history.

(56) References Cited

U.S. PATENT DOCUMENTS 4,665,690 A    5/1987    Yamauchi et al.

(Continued)

FOREIGN PATENT DOCUMENTS

DE    19906287 A1    8/2000

(Continued)

OTHER PUBLICATIONS

Bunting, "Springing the Trap," Automotive Engineer, Mechanical Engineering Pub. Ltd, Bury St. Edmunds, UK, vol. 25, No. 5, May 2000, pp. 73-74 (cited in ISR of Foreign Pat Pub #1, #2, #3, #6, cited in ISR made of record in US Pat Pub #4, #6, #8).

(Continued)

*Primary Examiner*—Binh Q. Tran
(74) *Attorney, Agent, or Firm*—Nicolas E. Seckel

(57) ABSTRACT

The inventive system for assisting in the regeneration of depollution means (1) which is integrated in the exhaust means (3) of a diesel engine (4), wherein the engine (4) is associated with a common rail supplying means (7, 8) for injecting fuel into cylinders thereof using at least one post-injection and for carrying out at least two regeneration strategies by isotorque modifying the parameters of the engine operation control, wherein the first regeneration strategy comprises a first level strategy and a second level strategy and the second regeneration strategy comprising the first level strategies and a sequence alternating the second and second over-calibrated level strategies, thereby making it possible to obtain different thermal levels in the line. The inventive system is characterized in that it comprises means (8) for determining the number of incomplete regenerations of the depollution means and means (8) for comparing said number with the threshold values in order to carry out the first regeneration strategy for the number lower than said threshold values or the second strategy for the number greater than the threshold values.

20 Claims, 2 Drawing Sheets

U.S. PATENT DOCUMENTS

| | | | |
|---|---|---|---|
| 5,121,601 A * | 6/1992 | Kammel | 60/275 |
| 5,207,990 A | 5/1993 | Sekiya et al. | |
| 5,511,413 A | 4/1996 | Pfister et al. | |
| 6,325,041 B1 | 12/2001 | Mamiya et al. | |
| 6,438,948 B2 | 8/2002 | Ono et al. | |
| 6,594,989 B1 | 7/2003 | Hepburn et al. | |
| 6,708,487 B2 * | 3/2004 | Morimoto et al. | 60/311 |
| 6,901,751 B2 * | 6/2005 | Bunting et al. | 60/297 |
| 6,948,311 B2 | 9/2005 | Schaller et al. | |
| 7,017,337 B2 * | 3/2006 | Plote et al. | 60/295 |
| 7,104,051 B2 | 9/2006 | Shimasaki et al. | |
| 7,121,083 B2 * | 10/2006 | Ishibashi et al. | 60/285 |
| 7,134,275 B2 * | 11/2006 | Tsutsumoto et al. | 60/295 |
| 7,137,247 B2 | 11/2006 | Koga et al. | |
| 7,159,384 B2 | 1/2007 | Otake et al. | |
| 7,181,909 B2 | 2/2007 | Sato et al. | |
| 7,310,941 B2 | 12/2007 | Kuboshima et al. | |
| 2002/0112472 A1 | 8/2002 | Tashiro et al. | |
| 2002/0175212 A1 | 11/2002 | Hepburn et al. | |
| 2003/0033800 A1 | 2/2003 | Tonetti et al. | |
| 2003/0089102 A1 | 5/2003 | Colignon | |
| 2003/0106309 A1 | 6/2003 | Morimoto et al. | |
| 2003/0131592 A1 | 7/2003 | Saito et al. | |
| 2003/0172642 A1 | 9/2003 | Nakatani et al. | |
| 2003/0230077 A1 | 12/2003 | Kuboshima et al. | |
| 2003/0230079 A1 | 12/2003 | Kuboshima et al. | |
| 2004/0000139 A1 | 1/2004 | Kawashima et al. | |
| 2004/0016227 A1 | 1/2004 | Kitahara | |
| 2004/0035101 A1 | 2/2004 | Imai et al. | |
| 2004/0055285 A1 | 3/2004 | Rohr et al. | |
| 2004/0074225 A1 | 4/2004 | Schaller et al. | |
| 2007/0157818 A1 | 7/2007 | Colignon | |
| 2007/0245721 A1 | 10/2007 | Colignon | |
| 2008/0010978 A1 | 1/2008 | Colignon | |
| 2008/0016854 A1 | 1/2008 | Colignon | |
| 2008/0041039 A1 | 2/2008 | Colignon | |
| 2008/0059040 A1 | 3/2008 | Colignon | |
| 2008/0066445 A1 | 3/2008 | Colignon | |

FOREIGN PATENT DOCUMENTS

| | | |
|---|---|---|
| DE | 19952830 A1 | 5/2001 |
| EP | 0349788 A1 | 1/1990 |
| EP | 0708809 B | 9/2000 |
| EP | 1041262 A2 | 10/2000 |
| EP | 1072763 A1 | 1/2001 |
| EP | 1108862 A2 | 6/2001 |
| EP | 1130230 A1 | 9/2001 |
| EP | 1134397 A | 9/2001 |
| EP | 1234959 A2 | 8/2002 |
| EP | 1281843 A | 2/2003 |
| EP | 1281852 A | 2/2003 |
| EP | 1281852 A1 | 2/2003 |
| EP | 1310656 A1 | 5/2003 |
| EP | 1321642 A1 | 6/2003 |
| EP | 1375877 A2 | 1/2004 |
| EP | 1386656 A1 | 2/2004 |
| EP | 1400663 A2 | 3/2004 |
| EP | 1405999 A1 | 4/2004 |
| FR | 2771449 A1 | 5/1999 |
| FR | 2774421 A1 | 8/1999 |
| FR | 2781251 A1 | 1/2000 |
| FR | 2801635 A | 6/2001 |
| FR | 2802572 A1 | 6/2001 |
| FR | 2802972 A1 | 6/2001 |
| FR | 2809767 A1 | 12/2001 |
| FR | 2811370 A1 | 1/2002 |
| FR | 2828234 A1 | 2/2003 |
| FR | 2829798 A1 | 3/2003 |
| FR | 2835566 A1 | 8/2003 |
| FR | 2836956 A1 | 9/2003 |
| FR | 2872215 B1 | 11/2006 |
| FR | 2820462 A1 | 7/2008 |
| JP | 62159713 A | 7/1987 |
| JP | 63120812 A | 5/1988 |
| WO | 01/51779 A1 | 7/2001 |
| WO | 02/075138 A1 | 9/2002 |
| WO | 2006005862 A1 | 1/2006 |
| WO | 2006005863 A1 | 1/2006 |
| WO | 2006005865 A1 | 1/2006 |
| WO | 2006005866 A1 | 1/2006 |
| WO | 2006005867 A1 | 1/2006 |
| WO | 2006005870 A1 | 1/2006 |

OTHER PUBLICATIONS

"Diesel Fuel Regeneration," Dieselnet Technology Guide, Jul. 2001 (cited in iSR of Foreign Pat Pub #1, #2, #3, cited in ISR made of record in US Pat Pub #6).

* cited by examiner

SYSTEM FOR ASSISTING THE REGENERATION OF DEPOLLUTION MEANS FOR A MOTOR VEHICLE ENGINE

BACKGROUND ART

The present invention concerns a system for assisting the regeneration of depollution means integrated in an exhaust line of a motor vehicle diesel engine.

More particularly, the invention concerns such a system in which the engine is associated to common rail means for the supply of fuel to its cylinders, according to at least one post-injection.

Such a post-injection is, in a standard manner, an injection of fuel after the high dead center of the cylinder under consideration.

These supply means are adapted to implement at constant torque, through modification of parameters for controlling the operation of the engine, different regeneration strategies that make it possible to obtain different thermal states in the exhaust line.

Thus, for example, supply means implementing a first regeneration strategy according to a strategy called level 1 strategy and a second regeneration strategy according to a strategy called level 2 strategy and/or an over-calibrated level 2 strategy, have already been proposed.

Indeed, it is known that, to ensure the regeneration of depollution means such as a particle filter, the soot trapped therein is burned thanks to the thermal energy provided by the engine and to the exotherm obtained by the conversion of the HC and of the CO on means forming an oxidation catalyst placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, in critical driving conditions, such as, for example, city driving or in traffic jams, the levels reached with standard regeneration strategies of the particle filter can become insufficient to ensure a correct regeneration of the filter, which can translate into regenerations that last very long and are thus highly fuel-consuming, or even incomplete.

SUMMARY OF THE INVENTION

Any strategy for the elevation of the thermal levels during those critical driving conditions makes it thus possible to ensure complete regenerations, to reduce the over-consumption caused by this regeneration of the particle filter, and above all, to increase the security margin with respect to the cracking or the breakage of these filters.

The objective of the present invention is to propose such a strategy.

To this effect, an object of the invention is a system for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at constant torque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, making it possible to obtain different thermal levels in the exhaust line, characterized in that it comprises means for determining the number of incomplete regenerations of the depollution means and means for comparing this number with predetermined threshold values, to implement the first regeneration strategy for a number lower than the threshold values or the second strategy for a number higher than the threshold values.

According to other characteristics:
the depollution means comprise a particle filter;
the particle filter is catalyzed;
the depollution means comprise an NOx trap;
the fuel comprises an additive intended to be deposited, with the particles with which it is mixed, on the depollution means to facilitate their regeneration;
the fuel comprises an additive forming NOx trap,
the depollution means are impregnated with an SCR formulation, ensuring a CO/HC oxidation function; and
the engine is associated with a turbo-compressor.

BRIEF DESCRIPTION OF THE DRAWINGS

The invention will be better understood by reading the following description given as an example only and made in reference to the annexed drawings, in which.

DETAILED DECRIPTION OF PARTICULAR EMBODIMENTS

Figure 1:
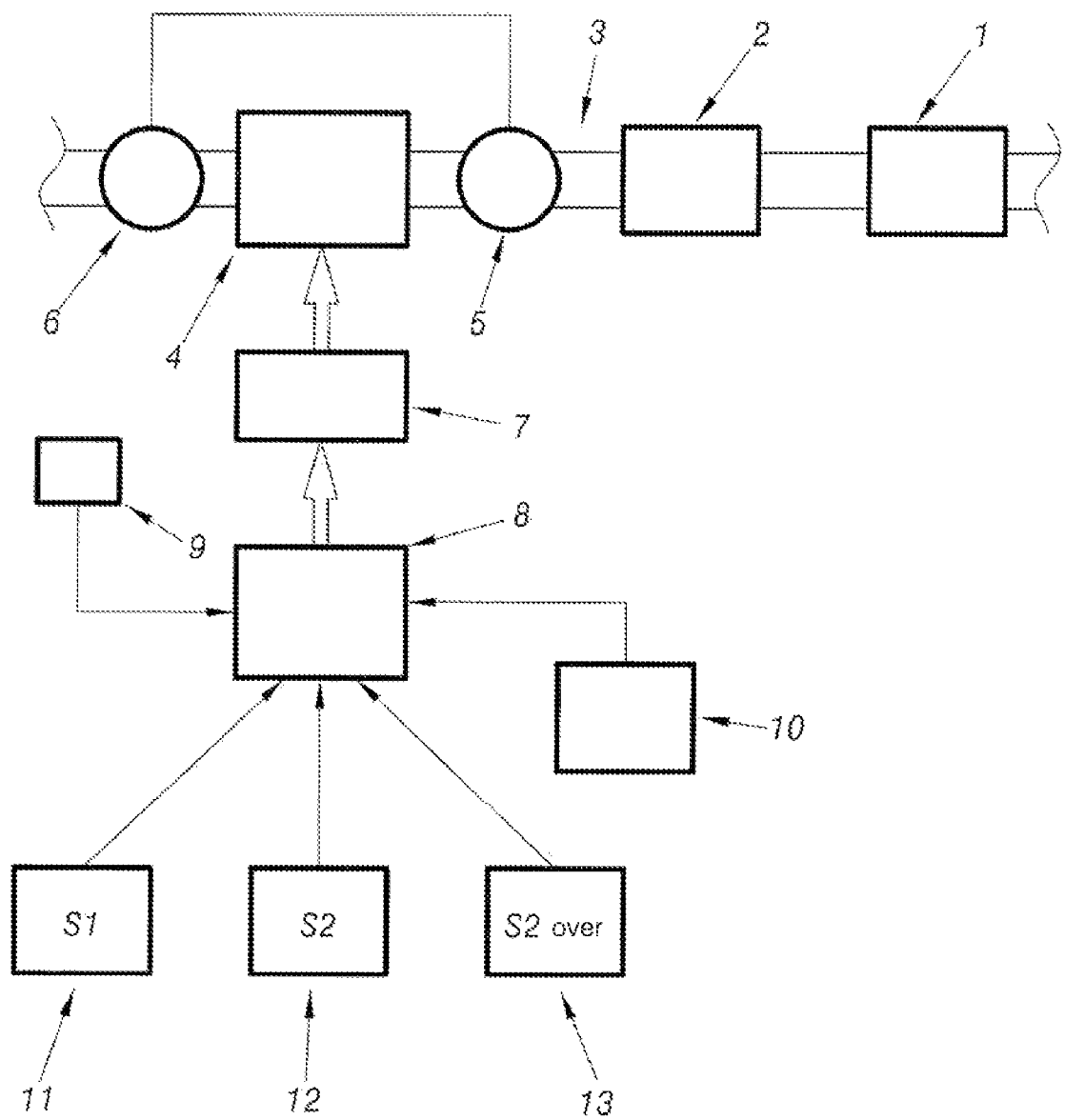
FIG. 1 is a synoptic schematic view illustrating the structure of an assistance system according to the invention.

Indeed, FIG. 1 shows a system for assisting the regeneration of depollution means designated by the general reference 1, associated with means forming oxidation catalyst, designated by the general reference 2 and placed in an exhaust line 3 of a thermal engine such as a motor vehicle diesel engine.

This engine is designated by the general reference 4 and can be associated, for example, with a turbo-compressor whose turbine portion 5 is associated with the exhaust line and whose compressor portion 6 is placed upstream of the engine.

The engine is associated with common rail means for the supply of fuel to the cylinders thereof, designated by the general reference 7, whose operation is controlled by a supervisor 8.

According to the invention, this system also comprises means for determining the number of incomplete regenerations of the depollution means and means for comparing this number with predetermined threshold values, to control the operation of the engine.

The analysis means formed, for example, by the supervisor 8, are then connected to means for determining this number, designated by the general reference 9, supplying this number to the supervisor 8, so as to enable the latter to compare it to threshold values such as supplied by generation means 10 comprising any appropriate means making it possible to establish these threshold values.

The determination of the number of incomplete regenerations of the depollution means is indeed important.

Indeed, when the depollution means such as a particle filter have just been subjected to several consecutive incomplete regenerations, whether these regenerations are partial or failed, the supervisor of the depollution means estimates improperly the amount of soot that is present in the filter.

Indeed, there is, on the one hand, a non-correlation between the mass of particles present in the filter and the head losses measured at the boundaries of the particle filter (or the counter-pressure measured at the inlet of the filter), and on the other hand, a spatial heterogeneity of the distribution of the soot in the filter, the periphery of the filtering support being often more loaded than the center.

Thus, it is then necessary to be able to ensure a complete regeneration in order to reinitialize the load of the particle filter with the most confidence possible.

The determination of an incomplete regeneration can be performed in any appropriate manner already known of the state of the art, by using, for example, mapping means, the time passed above a certain temperature of the exhaust line, a calculation of the average temperature at the inlet of the depollution means during the regeneration attempt, a mathematical model of decrementation of the mass of soot trapped in the depollution means, in which the speed of combustion of the soot is a function of the temperature of the gases, etc.

In fact, the supervisor and the common rail means for the fuel supply are adapted to drive the engine according to different regeneration strategies which make it possible to obtain different thermal levels in the exhaust line, and in particular, a first regeneration strategy comprising level 1 strategies, S1, as designated by the general reference 11 on this FIG. 1, and level 2 strategies, S2, as designated by the reference 12 on this Figure, and a second regeneration strategy comprising level 1 strategies, S1, and a sequence alternating level 2 strategies, S2, and over-calibrated level 2 strategies, S2 over, as designated by the general reference 13 on this Figure.

In fact, in the system according to the invention, and as a function of the results of the comparison performed by the means for comparing the number of incomplete regenerations of the depollution means to predetermined threshold values, a regeneration strategy is implemented according to a level 1 and level 2 operation mode for a number lower than the predetermined threshold values, and according to a level 1 operation mode associated with a sequence alternating level 2 and over-calibrated level 2 operation modes, for a number higher than the predetermined threshold levels.

This makes it thus possible to maximize the chances of success of the regeneration, in particular in critical driving conditions, such as, for example, city driving or in traffic jams.

By way of example, one can go from the following criteria for a standard level 2 calibration for assisting the regeneration of a particle filter:
- maximal exhaust collector temperature=800° C.
- maximal catalyst exotherm=150° C.
- maximal catalyst outlet temperature=710° C.
- maximal catalyst internal temperature=760° C.
- minimal oxygen content of the gases at catalyst outlet=3% to the following criteria for an over-calibrated level 2 strategy:
- maximal exhaust collector temperature=830° C.
- maximal catalyst exotherm=200° C.
- maximal catalyst outlet temperature=730° C.
- maximal catalyst internal temperature=no maximal value
- minimal oxygen content of the gases at catalyst outlet=2%

With the following results:

| | |
|---|---|
| EUDC cycles | temperature at PF inlet of 600° C. reached in 200 sec. instead of 600 sec. with standard RG temperature at PF inlet of 650° C. reached in 220 sec. whereas this temperature is never reached with standard RG |
| City cycle | temperature at PF inlet of 500° C. reached in 100 sec. instead of 150 sec. with standard RG temperature at PF inlet of 550° C. reached in 105 sec. instead of 300 sec. with standard RG temperature at PF inlet of 600° C. reached in 150 sec. whereas this temperature is never reached with standard RG |

Figure 2:
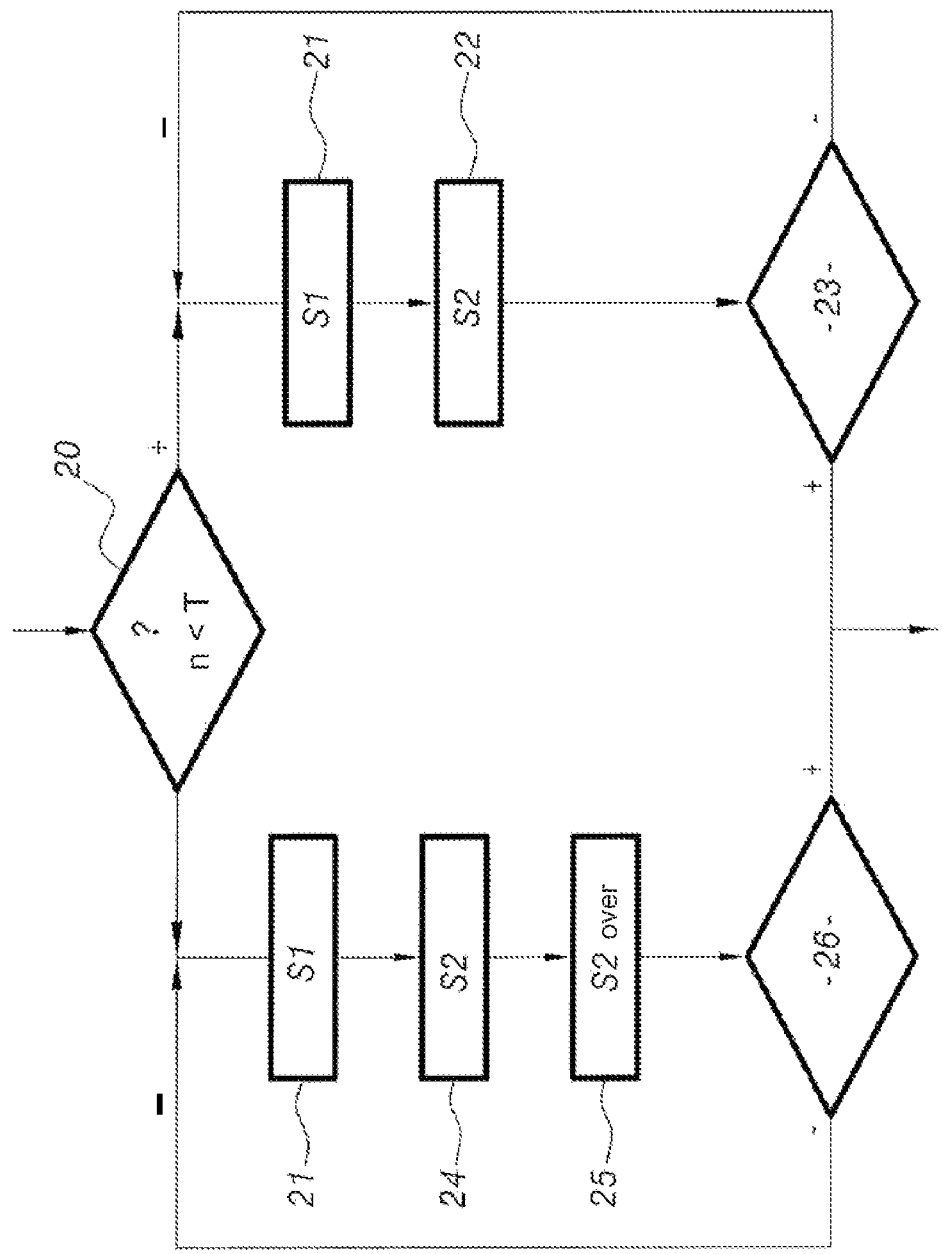
FIG. 2 illustrates the operation thereof.

FIG. 2 shows a flow chart illustrating the operation of this regeneration assistance system.

This operation begins with a phase of acquisition of the number of incomplete regenerations of the depollution means from the different items of information mentioned above.

This number is subsequently compared by the supervisor, at 20, to threshold values.

If the number is lower than the threshold values, the regeneration strategy implements a strategy called level 1 strategy, at 21, associated with a strategy called level 2 strategy, at 22, until the end of the regeneration as determined at 23.

Conversely, if the number is higher than the threshold values, the supervisor implements a second regeneration strategy comprising a level 1 strategy, at 21, associated with a sequence alternating level 2 strategies and over-calibrated level 2 strategies, such as those designated by 24 and 25 on this Figure, until the end of the regeneration as detected at 26.

It is of course self-evident that different embodiments of this system can be envisioned, and that the depollution means can comprise a particle filter, such as, for example, a catalyzed particle filter or an NOx trap.

In addition, the fuel can also comprise an additive intended to be deposited, with the particle with which it is mixed, on the depollution means to facilitate their regeneration.

These depollution means can also be impregnated with an SCR formulation ensuring a CO/HC oxidation function in a standard manner.

Other means forming oxidation catalyst can be envisioned, and the depollution means and the means forming oxidation catalyst can be integrated into a single and same element, in particular on the same substrate.

By way of example, a particle filter integrating the oxidation function can be envisioned.

Similarly, an NOx trap integrating such an oxidation function can also be envisioned, whether it is additivized or not.

This oxidation and/or NOx trap function can be implemented, for example, by an additive mixed with the fuel.

The invention claimed is:

1. System for assisting the regeneration of depollution means integrated in an exhaust line of a motor vehicle diesel engine,
   in which the engine is associated with common rail supply means for the injection of fuel into the cylinders thereof, according to at least one post-injection, and adapted to implement, at constant torque, through modification of parameters for controlling the operation of the engine, wherein modified parameters control a modified operation mode of the engine during each regeneration phase, at least two regeneration strategies, among which
      a first regeneration strategy comprising strategies called level 1 strategies and level 2 strategies, and
      a second regeneration strategy comprising level 1 strategies and a sequence alternating level 2 strategies and over-calibrated level 2 strategies,
   making it possible to obtain different thermal levels in the exhaust line, wherein said system comprises means for determining the number of regeneration phases in which regeneration of the depollution means was incomplete and means for comparing this number with predetermined threshold values, to implement the first regeneration strategy for a number lower than the threshold values or the second strategy for a number higher than the threshold values.

2. System according to claim 1, wherein the depollution means comprise a particle filter.

3. System according to claim 2, wherein the particle filter is catalyzed.

4. System according to claim 1, wherein the depollution means comprise an NOx trap.

5. System according to claim 1, wherein the fuel comprises an additive intended to be deposited, with the particles with which it is mixed, on the depollution means to facilitate their regeneration.

6. System according to claim 1, wherein the fuel comprises an additive forming NOx trap.

7. System according to claim 1, wherein the depollution means are impregnated with an SCR formulation, ensuring a CO/HC oxidation function.

8. System according to claim 1, wherein the engine is associated with a turbo-compressor.

9. System according to claim 2, wherein the depollution means comprise an NOx trap.

10. System according to claim 3, wherein the depollution means comprise an NOx trap.

11. Method of assisting the regeneration of depollution means integrated in an exhaust line of a motor vehicle diesel engine, in which the engine is associated with common rail supply means for the injection of fuel into the cylinders thereof, according to at least one post-injection, said method comprising:
  implement, at constant torque, through modification of parameters for controlling the operation of the engine, wherein modified parameters control a modified operation mode of the engine during each regeneration phase, at least two regeneration strategies, among which:
    a first regeneration strategy comprising strategies called level 1 strategies and level 2 strategies, and
    a second regeneration strategy comprising level 1 strategies and a sequence alternating level 2 strategies and over-calibrated level 2 strategies, so as to obtain different thermal levels in the exhaust line,
  determining a number of regeneration phases in which regeneration of the depollution means was incomplete, and
  comparing this number with predetermined threshold values, to implement the first regeneration strategy for a number lower than the threshold values or the second strategy for a number higher than the threshold values.

12. Method according to claim 11, wherein the depollution means comprise a particle filter.

13. Method according to claim 12, wherein the particle filter is catalyzed.

14. Method according to claim 11, wherein the depollution means comprise an NOx trap.

15. Method according to claim 11, wherein the fuel comprises an additive intended to be deposited, with the particles with which it is mixed, on the depollution means to facilitate their regeneration.

16. Method according to claim 11, wherein the fuel comprises an additive forming NOx trap.

17. Method according to claim 11, wherein the depollution means are impregnated with an SCR formulation, ensuring a CO/HC oxidation function.

18. Method according to claim 11, wherein the engine is associated with a turbo-compressor.

19. Method according to claim 12, wherein the depollution means comprise an NOx trap.

20. Method according to claim 13, wherein the depollution means comprise an NOx trap.

* * * * *